United States Patent
Kaifu et al.

(10) Patent No.: US 6,333,963 B1
(45) Date of Patent: *Dec. 25, 2001

(54) IMAGE SENSING APPARATUS AND METHOD

(75) Inventors: Noriyuki Kaifu, Hachioji; Yutaka Endo, Utsunomiya; Isao Kobayashi, Atsugi; Toshio Kameshima, Sagamihara; Hideki Nonaka; Takashi Ogura, both of Utsunomiya, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,553

(22) Filed: May 20, 1998

(30) Foreign Application Priority Data

May 26, 1997 (JP) .................................... 9-135083

(51) Int. Cl.[7] .................................................. H05G 1/64
(52) U.S. Cl. ........................................ 378/98.2; 378/98.8
(58) Field of Search .............................. 378/98.2, 98.7, 378/98.8, 98.12, 95, 108, 110, 112, 116, 207; 396/97, 225, 231

(56) References Cited

U.S. PATENT DOCUMENTS

| | | | |
|---|---|---|---|
| 4,366,382 | * 12/1982 | Kotowski | 378/57 |
| 4,509,077 | 4/1985 | Therrien | 358/139 |
| 4,562,586 | 12/1985 | Honda et al. | 378/108 |
| 4,789,930 | * 12/1988 | Sones et al. | 250/361 R |
| 5,452,338 | * 9/1995 | Granfors et al. | 378/98.11 |
| 5,604,781 | 2/1997 | Suzuki et al. | 378/62 |
| 5,778,044 | * 7/1998 | Bruijns | 378/98.7 |
| 5,887,049 | * 3/1999 | Fossum | 378/98.8 |

FOREIGN PATENT DOCUMENTS 07-236093    9/1995  (JP) .

* cited by examiner

Primary Examiner—David P. Porta
(74) Attorney, Agent, or Firm—Fitzpatrick, Cella, Harper & Scinto

(57) ABSTRACT

The invention relates to an image sensing apparatus and method which form an image by using radiation including visible light, X-rays, and the like (which is generically called light in the invention), and also relates to a -one- or two-dimensional image sensing apparatus such as a facsimile apparatus, a digital copying machine, a still camera, or a radiation image sensing apparatus, and an image sensing method. This image sensing apparatus uses a photo-electric conversion device. The image sensing apparatus has an image sensing means including a plurality of photo-electric elements arranged one- or two-dimensionally to obtain image information with a high S/N ratio by solving the problem that errors contained in the photographic output cannot be completely corrected because of the differences between the conditions set to obtain data to be used for correction and the conditions set for actual photographing operation. The image sensing apparatus includes a means for storing a photographic output in the photographic mode, a means for storing photographic conditions in the photographic mode, means for obtaining a correction output in the correction mode which is activated by using the stored photographic conditions, and a means for correcting the photographic output by using the correction output. With this arrangement, correction data is acquired under operation conditions set in accordance with operation conditions in photographing operation.

24 Claims, 6 Drawing Sheets

IMAGE SENSING APPARATUS AND METHOD

BACKGROUND OF THE INVENTION

1. Field of the Invention

The present invention relates to an image sensing apparatus and method which form an image by using radiation including visible light, X-rays, and the like (which will be generically called light in the present invention) and, more particularly, to a -one- or two-dimensional image sensing apparatus such as a facsimile apparatus, a digital copying machine, a still camera, or a radiation image sensing apparatus, and an image sensing method.

2. Description of the Related Art

Various image sensing apparatuses using large sensors each having a -one- or two-dimensional array of image sensing elements, each using a monocrystalline Si sensor typified by a CCD sensor and a MOS sensor or a PIN sensor consisting of hydrogenated amorphous silicon (to be referred to as a-Si hereinafter) have been proposed.

As these image sensing apparatuses, in addition to image sensing apparatuses designed to convert a visible light image into an electrical signal, image sensing apparatuses designed to convert a radiation image into an electrical signal have also been developed with development in nuclear technology and advances in medical radiographic devices and nondestructive testing.

Many of these image sensing apparatuses, however, have S/N ratios of the order of -2- and 3-digit figures, and have not been required to have higher S/N ratios for the following reasons. There have been no A/D converters suited to high-precision digitization of outputs with high S/N ratios. In addition, since the data amount after conversion becomes large, limitations are imposed on memories and communications, resulting in poor operability. This has reduced the necessity of image sensing apparatuses with high S/N ratios.

With the recent remarkable developments in large-capacity memories and high-speed communications, great demands have arisen for image sensing apparatuses with high S/N ratios of the order of -4- and 5-digit figures.

In general, however, a decrease in S/N ratio is inevitably caused by variations in the manufacturing process and variations in fixed patterns and sensitivity. To prevent this, the fixed pattern and sensitivity variations are stored in a memory, and correction is performed in actual operation by using the photographic output and the information in the memory.

In this technique, however, since the data used for correction is obtained before photographing operation, the following problems are posed.

In general, in using an image sensing apparatus, the user selects operation conditions for the apparatus in accordance with the purpose of photography or the like. In addition, the components of the image sensing apparatus vary in characteristics with changes in temperature. Furthermore, various types of automatic control such as automatic exposure and automatic gain adjustment are activated during photographing operation to easily obtain optimal images without mistakes. That is, the conditions actually set for the photographing operation differ from the conditions set to generate the data used for correction. Since fixed pattern and sensitivity variations that cause a drop in S/N ratio slightly vary depending on these conditions, errors contained in the photographic output cannot be corrected perfectly. As described above, the differences between the conditions set to obtain the data used for correction and the conditions set for the actual photographing operation may pose a problem in obtaining image information with a high S/N ratio.

SUMMARY OF THE INVENTION

It is an object of the present invention to provide an image sensing apparatus and method which can obtain image information with a high S/N ratio by solving the problem that errors contained in a photographic output cannot be corrected perfectly in some cases owing to the differences between the conditions set to obtain the data used for correction and the conditions set for the actual photographing operation.

It is another object of the present invention to provide an image sensing apparatus which can acquire correction data after photographing operation under the same conditions as those for the photographing operation, and an image sensing method which can acquire correction data by reproducing the photographic conditions as needed.

It is still another object of the present invention to an image sensing apparatus and method which can acquire correction data regardless of the time required for setting various conditions for photographing operation, e.g., the angle and position of the object, a target portion of the object, the time required for determining the position of a patient, or the time required for the patient to hold his/her breath, i.e., can acquire correction data after photographing operation, thereby obtaining image information with a high S/N ratio by acquiring correction data under conditions similar to the conditions set for photographing operation by omitting only an object (to be photographed) even when correction data is obtained by irradiating photographing light.

It is still another object of the present invention to provide an image sensing apparatus having image sensing means including a plurality of photo-electric elements arranged -one- or two-dimensionally, comprising:

means for storing a photographic output (an image signal output) obtained in a photographic mode;

means for storing a photographic condition in the photographic mode;

means for obtaining a correction output in a correction mode activated using the stored photographic condition; and means for correcting the photographic output by using the correction output.

It is still another object of the present invention to provide an image sensing apparatus comprising:

image sensing means including a plurality of photo-electric elements arranged -one- or two-dimensionally;

image information irradiation means including a light source for emitting photographing light for obtaining image information light to be incident on the photo-electric element;

photographic condition control means for controlling a photographic condition for at least the light source;

condition storage means for storing a set value set by the photographic condition control means;

photographic output storage means (image signal output storage means) for storing a photographic output (an image signal output) obtained in photographing operation;

means for obtaining a correction output by causing the photographic condition control means to perform set operation in accordance with the set value stored in the condition storage means;

an arithmetic processing circuit for correcting the photographic output stored in the photographic output storage means by using the correction output; and system control means for controlling the respective means.

It is still another object of the present invention to provide an image sensing method for an image sensing apparatus including image sensing means including a plurality of photo-electric elements arranged -one- or two-dimensionally, image information irradiation means including a light source for emitting photographing light for obtaining image information light to be incident on the photo-electric element, photographic condition control means for controlling a photographic condition for at least the light source, photographic output storage means for storing a photographic output, and condition storage means for storing a condition automatically controlled by the photographic condition control means, comprising the steps of:

causing the image information irradiation means to irradiate the image sensing means with image information light while operating the photographic condition control means to obtain a desired photographic output, causing the photographic output storage means to store the photographic output, and at the same time, causing the condition storage means to store a set value selected by the photographic condition control means; and causing the photographic condition control means to perform set operation in accordance with the set value stored in the condition storage means, setting an obtained output as a correction output, and processing the correction output and the photographic output stored in the photographic output storage means by using an arithmetic processing circuit, thereby. obtaining a corrected photographic output.

In order to achieve the above objects, there is provided an image sensing apparatus having image sensing means including a plurality of photo-electric elements arranged -one- or two-dimensionally, comprising:

means for storing a photographic output obtained in a photographic mode;

means for storing a photographic condition in the photographic mode;

means for obtaining a correction output in a correction mode activated using the stored photographic condition; and means for correcting the photographic output by using the correction output.

Preferably, the means for obtaining the correction output is means for obtaining a correction output in correction mode 1, which is activated without irradiating the photo-electric elements with photographing light, by using the stored photographic condition. Preferably, the means for obtaining the correction output is means for obtaining a correction output in correction mode 2, which is activated while the photo-electric elements are irradiated with reference light in the absence of an object, by using the stored photographic condition.

Preferably, the image sensing apparatus further comprises means for correcting the photographic output by using the correction outputs in both correction mode 1 and correction mode 2.

In addition, in order to achieve the above objects, there is provided an image sensing apparatus including image sensing means including a plurality of photo-electric elements arranged -one- or two-dimensionally, comprising:

image information irradiation means capable of controlling photographing light from a light source, which is used to obtain image information light to be incident on the photo-electric elements, photographic condition control means capable of controlling a photographic condition, and condition storage means in which the photographic condition control means stores a condition set for photographing operation, and a system control circuit and a correction circuit for causing the image information irradiation means to irradiate the image sensing means with image information light while operating the photographic condition control means to obtain a desired photographic output, causing the photographic output storage means to store the photographic output, and at the same time, causing the condition storage means to store a set value selected by the photographic condition control means; and causing the photographic condition control means to perform set operation in accordance with the set value stored in the condition storage means, setting an obtained output as a correction output, and processing the correction output and the photographic output stored in the photographic output storage means by using an arithmetic processing circuit, thereby obtaining an output from which errors in the image sensing means are removed.

Preferably, the image information irradiation means includes a light source for irradiating a sensor with pulse-like image information light (light containing image information) and/or reference light (photographing light), and a driving circuit for the light source. Preferably, the pulse width of the light can be set/controlled by the photographic condition control means. Preferably, the image sensing apparatus includes a gain adjustment circuit, and the gain of the circuit can be automatically controlled and set/controlled by the photographic condition control means. Preferably, the gain adjustment circuit includes a plurality of analog/digital converters, and a proper converter can be selected in accordance with the value of the output from the image sensing means. Preferably, this selection can be automatically controlled and set/controlled by the photographic condition control means. Preferably, the photo-electric element is of a storage type, and the storage time can be automatically controlled and set/controlled by the photographic condition control means.

Preferably, the photographic condition control means is automatically controlled.

The image information irradiation means is constituted by a radiation source and a phosphor screen. An object can be placed between the radiation source and the phosphor screen. With this arrangement, chest X-ray examination or breast cancer examination can be done without using an X-ray film.

According to the present invention, first of all, photographing is done under controlled conditions, preferably conditions having undergone various types of automatic control operations, to obtain a photographic output. This photographic output and the photographic conditions are stored. Conditions are set in accordance with the photographic conditions stored in the photographing operation and a desired photographic output, and the apparatus is operated again under the set conditions, thereby obtaining a correction output. With this operation, the conditions set to obtain the data to be used for correction can be made to be substantially the same as the conditions for actual photographing operation.

By correcting the stored photographic output using this correction output, a photographic output with fewer errors can be obtained, and image information with a high S/N ratio can be obtained.

In addition, according to the present invention, since a correction output can be obtained under the same conditions as those for photographing operation even if various types of automatic control operations are performed, a high-performance image sensing apparatus which is easy to use and allows photographing operation under almost optimal conditions can be provided.

Furthermore, the dark output from each photo-electric element can be corrected by using a correction output in correction mode 1 that is activated without irradiating each photo-electric element with light.

Moreover, errors due to gain variations can be removed by using a correction output in correction mode 2 which is activated while each photo-electric element is irradiated with reference light in the absence of an object.

DESCRIPTION OF THE PREFERRED EMBODIMENTS

The present invention will be described below with reference to the accompanying drawings. The present invention is not limited to the contents to be described below, and various modifications and combinations of the embodiments can be made within the spirit and scope of the invention.

[First Embodiment]

Figure 1:
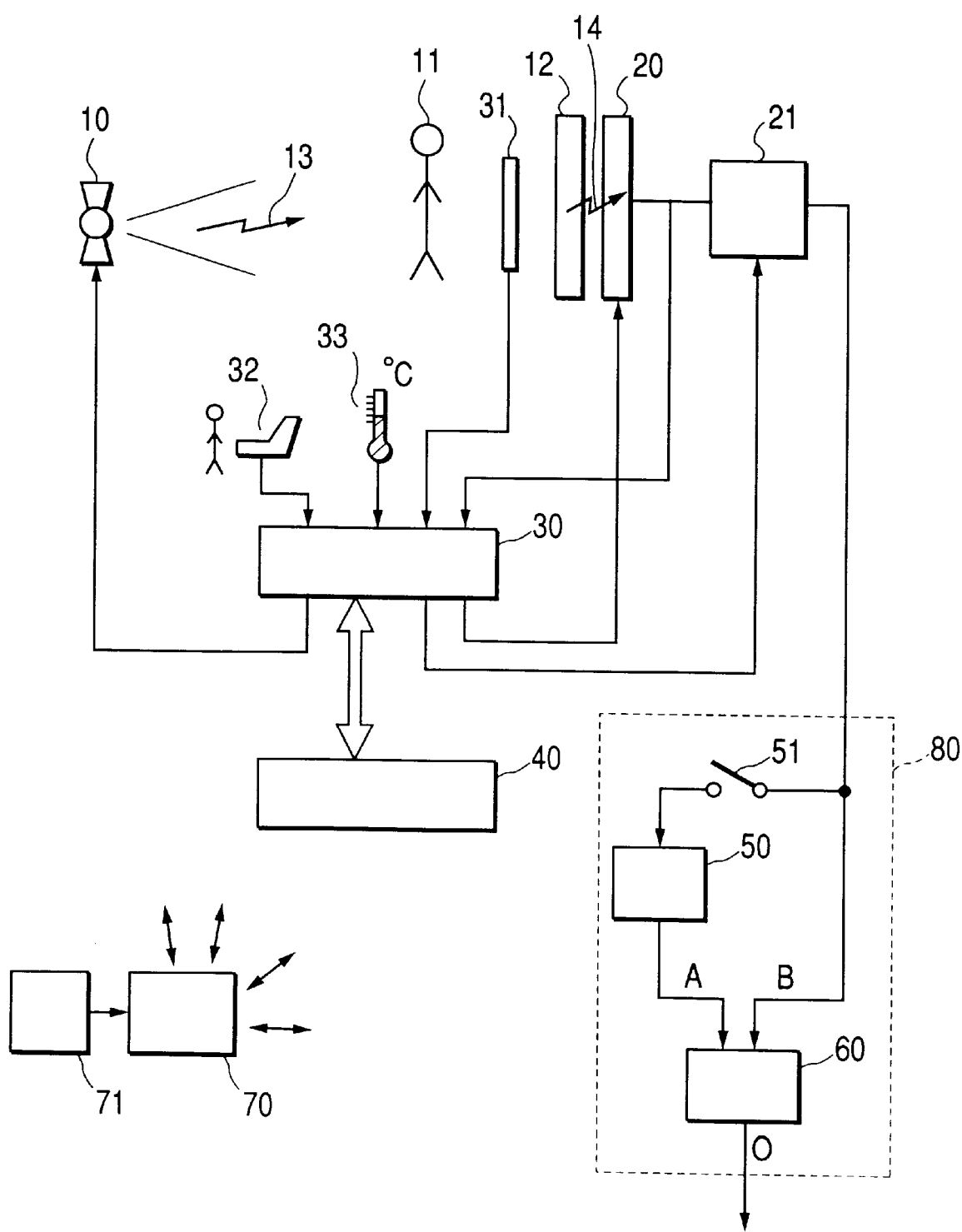
FIG. 1 is a block diagram showing the schematic arrangement of an apparatus according to a preferred embodiment of the present invention.

The first embodiment of the present invention will be described in detail with reference to the accompanying drawings. FIG. 1 is a block diagram showing the overall arrangement of an image sensing apparatus according to the first embodiment of the present invention. This embodiment exemplifies the radiation image sensing apparatus designed for medical X-ray diagnosis.

Referring to FIG. 1, an X-ray source (light source) 10 can emit photographing light (X-rays in this case) 13 in the form of pulses. An AE controller 30 serving as a photographic condition control means ON/OFF-controls X-ray pulses and controls the tube voltage and current of a tube in the X-ray source. The X-rays 13 emitted from the X-ray source 10 are transmitted through an object 11 as a patient to be diagnosed and become incident on a phosphor screen 12 made of a wavelength converter, e.g., CsI or $Gd_2O_2$, that converts X-rays into light in the photosensitive wavelength region of a sensor 20, e.g., visible light. The amount of X-rays transmitted through the object 11 differs depending on the sizes and shapes of bones and internal organs in the object 11 and the presence/absence of a morbid portion, and contain their image information. The X-rays 13 are converted into visible light by the phosphor screen 12 and enter as image information light 14 the two-dimensional area sensor 20 serving as an image sensing means. The two-dimensional area sensor 20 has a two-dimensional array of photo-electric elements and a driving circuit for driving these elements. The two-dimensional area sensor 20 converts the image information light 14 into an electrical signal containing two-dimensional information, and outputs it.

The storage time and drive speed of the two-dimensional area sensor 20 are controlled by the AE controller 30. The output from the two-dimensional area sensor 20 is input to a gain adjustment circuit 21 and is also input as information for controlling the photographic conditions to the AE controller 30.

The AE controller 30 also receives the outputs from a control panel 32, a temperature sensor 33, and a photo timer 31 to control the photographic conditions. A doctor or technician operates the control panel 32 to input conditions for an optimal photographic output in every photographic exposure operation in consideration of the condition, physique, age of a patient and information to be obtained. The control panel 32 converts the input conditions into electrical signals and inputs them to the AE controller 30.

The temperature sensor 33 detects the temperature in a room during photographic exposure, the temperature of the tube, and the temperatures of components, e.g., the two-dimensional area sensor 20, whose characteristics and optimal operation conditions change with changes in temperature, and inputs the resultant data to the AE controller 30. These detected temperatures are preferably the temperatures detected during photographic exposure.

For example, the photo timer 31 is placed between the object 11 and the two-dimensional area sensor 20 to detect the amount of X-rays transmitted through a reference portion (e.g., an alveolus portion) of the object 11 during photographic exposure, and inputs the resultant data to the AE controller 30. Since the X-rays absorbed by the photo timer 31 is very small in amount, photographic exposure is hardly affected by this absorption.

The AE controller 30 can perform automatic control and setting control on the X-ray pulse width of the X-ray source 10, the storage time and drive speed of the two-dimensional area sensor 20, and the amplification factor of the gain adjustment circuit 21 on the basis of the above input values immediately before photographic exposure and during photographic exposure. With these control operations, the output from the gain adjustment circuit 21 can be made to become a suitable photographic output.

In addition, the conditions controlled/set by the AE controller 30 during photographic exposure can be stored as condition values in a condition memory circuit 40 serving as a condition storage means. The condition memory circuit 40 can store conditions and also can input stored condition values to the AE controller 30. The AE controller 30 can control/set and operate the X-ray source 10, the two-dimensional area sensor 20, and the gain adjustment circuit 21 on the basis of the condition values input from the condition memory circuit 40. That is, photographic exposure can be performed under the same control/settings as those of past photograph exposure conditions. At this time, the conditions and control/settings are partly changed to perform correction exposure to obtain an output from the gain adjustment circuit 21 as a correction output.

Referring to FIG. 1, in a correction circuit 80 enclosed with the dashed line, a photographic output obtained during photographic exposure can be stored altogether in a frame memory 50 serving as a photographic output storage means via a switch 51, and the photographic output is processed by an arithmetic processing circuit 60 on the basis of a correction output B obtained during correction exposure and a photographic output A stored in the frame memory 50, thereby obtaining an image information output O, from which errors in photographing operation have been removed. This image information output O is transmitted to an image processing system or the like.

Upon detecting that a photographic exposure start button 71 is depressed, a system control circuit 70 controls the X-ray source 10, the two-dimensional area sensor 20, and the gain adjustment circuit 21 through the AE controller 30 to perform photographic exposure and correction exposure, although this operation is not shown. In addition, the system control circuit 70 controls the switch 51, the frame memory 50, and the arithmetic processing circuit 60 to operate them as the correction circuit 80.

According to the arrangement shown in FIG. 1, the image sensing apparatus comprises the image sensing means 20 including a -one- or two-dimensional array of photo-electric elements, the image information irradiation means 10 capable of irradiating the photo-electric elements with image information light, the photographic condition control means 30 capable of automatic control and setting control of photographic conditions, and the condition storage means 40 for storing the conditions automatically controlled by the photographic condition control means.

In this apparatus, the image information irradiation means 10 irradiates the image sensing means 20 with image information light while the photographic condition control means 30 is operated to obtain a desired photographic output by automatic control. The resultant photographic output is stored in the photographic output storage means 50. At the same time, the set values selected by the photographic condition control means 30 are stored in the condition storage means 40.

After this operation, the photographic condition control means 30 is caused to perform setting operation on the basis of the set values stored in the condition storage means 40. The resultant output is used as a correction output. The arithmetic processing circuit 60 then operates on the basis of this correction output and the photographic output stored in the photographic output storage means 50. As a result, an output from which errors caused by the image sensing means 20 are removed can be obtained.

Figure 2:
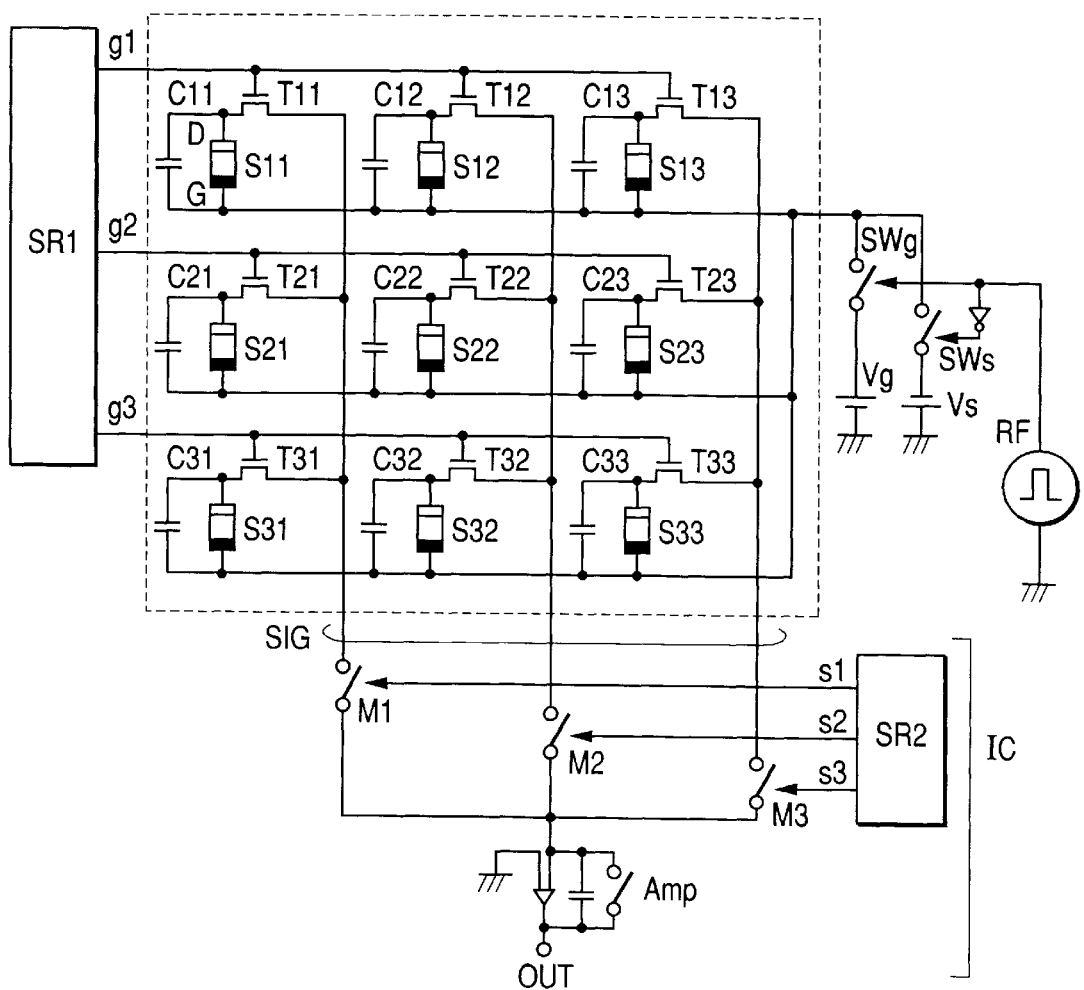
FIG. 2 is a circuit diagram schematically showing an overall arrangement example of a two-dimensional area sensor that can be applied to a photo-electric conversion device in the present invention.
Figure 3A:
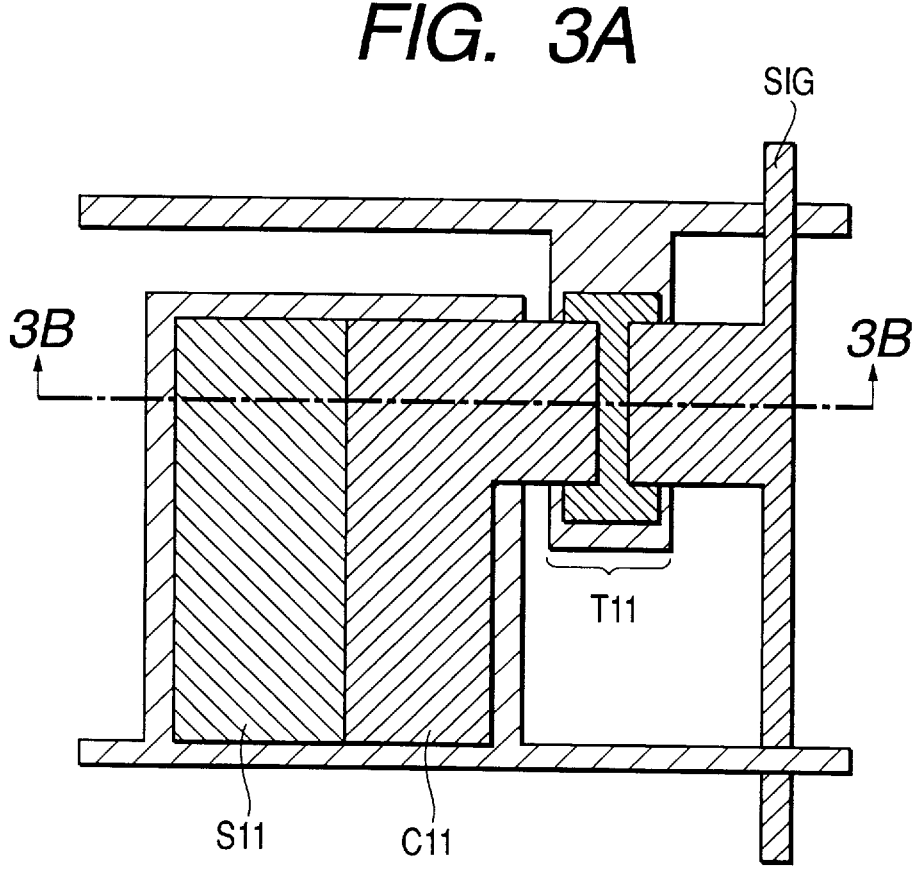
FIG. 3A is a schematic plan view for explaining an arrangement example of one pixel of the two-dimensional area sensor.
Figure 3B:
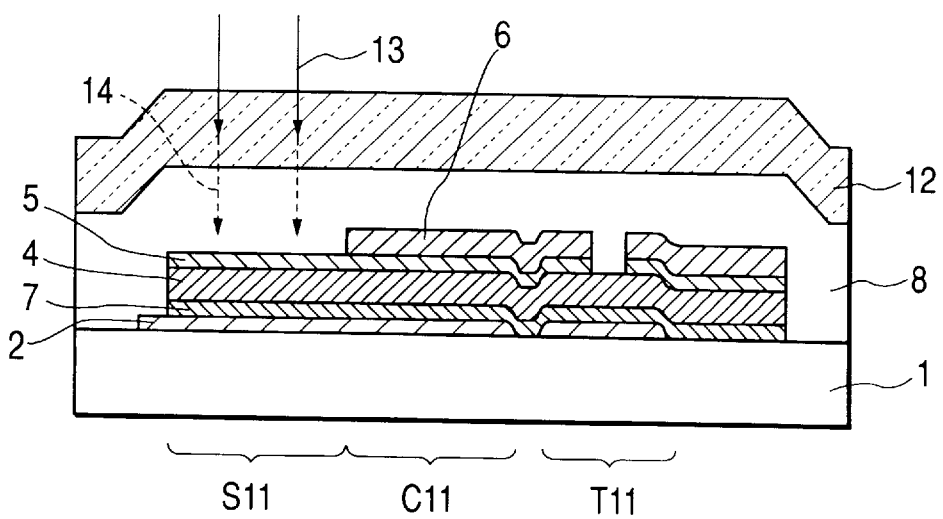
FIG. 3B is a sectional view of the pixel.

FIG. 2 is a circuit diagram showing an example of the overall arrangement of the two-dimensional area sensor 20. FIG. 3A is a schematic plan view showing an example of each constituent element corresponding to one pixel in the two-dimensional area sensor 20. FIG. 3B is a schematic sectional view of one pixel. Note that the same reference numerals denote parts with the same functions as in FIG. 1.

Referring to FIG. 2, the two-dimensional area sensor 20 includes photo-electric elements S11 to S33, each having a lower electrode side G and an upper electrode side D, capacitors C11 to C33, transfer TFTs T11 to T33, a read power supply Vs, and a refresh power supply Vg. The read power supply Vs and the refresh power supply Vg are connected to the G electrodes of all the photo-electric elements S11 to S33 through switches SWs and SWg. The switch SWs is connected to a refresh control circuit RF through an inverter. The switch SWg is directly connected to the refresh control circuit RF. In the refresh period, the switch SWg is kept on. In other periods, the switch SWs is kept on. One pixel is constituted by one photo-electric element, one capacitor, and one TFT. The signal output of each pixel is connected to a detection integrated circuit IC through a signal line SIG. In the two-dimensional area sensor 20 in this embodiment, a total of nine pixels are grouped into three blocks, and the outputs from the three pixels of each block are simultaneously transferred. The outputs from these blocks are sequentially converted and output by the detection integrated circuit IC through the signal lines. In addition, the three pixels in each block are arranged horizontally, and the three blocks are arranged vertically, thereby arranging the respective pixels two-dimensionally.

The portion enclosed with the dashed line in FIG. 2 is formed on a single insulating substrate having a large area. FIG. 3A is a schematic plan view of a portion corresponding to the first pixel of this portion. This pixel includes the photo-electric element S11, the TFT T11, the capacitor C11, and the signal line SIG. In this embodiment, the capacitor C11 and the photo-electric element S11 are not isolated from each other. The capacitor C11 is formed by increasing the area of the electrode of the photo-electric element S11. The photo-electric element and the capacitor can be formed in this manner because they have the same layer structure in this embodiment. FIG. 3B is a schematic sectional view taken along a line 3B—3B in FIG. 3A. A silicon nitride passivation film 8 consisting of SiN and a phosphor screen 12 such as CsI or $Gd_2O_2S$ are formed on the pixel. When X-rays 13 containing image information are incident on the pixel from above, they are converted into image information light 14 by the phosphor screen 12. This light then reaches the photo-electric element.

The steps in a method of forming each element will be briefly and sequentially described below with reference to FIGS. 3A and 3B.

First of all, Cr is deposited as a lower metal layer 2 on a glass substrate 1 as an insulating material to a thickness of about 500 Å by sputtering or the like. The lower metal layer 2 is then patterned by photolithography to etch away unnecessary areas. As a result, the lower electrode of the photo-electric element S11, the gate electrode of the TFT T11, and the lower electrode of the capacitor C11 are formed.

Subsequently, an SiN layer 7, an i-type layer 4, and an n-type layer 5 respectively having thicknesses about 2,000 Å, 5,000 Å, and 500 Å are deposited by CVD without breaking vacuum. These layers respectively become the insulating layer/photo-electric conversion semiconductor layer/hole injection preventing layer of the photo-electric element S11, the gate insulating film/semiconductor layer/ohmic contact layer of the TFT T11, and the intermediate layer of the capacitor Cll. The above layers are also used as the insulating layers of signal line crossing portions. The respective layers are not limited to these thicknesses and optimally designed in accordance with the voltage, current, charge, incident light amount, and the like to be set for the two-dimensional area sensor. At least the SiN layer needs to have a thickness of 500 Å or more so as to prevent the passage of electrons and holes and function as the gate insulating film of the TFT.

After the respective layers are deposited, Al is deposited as an upper metal layer 6 to a thickness of about 10,000 Å by sputtering or the like. The upper metal layer 6 is then patterned by photolithography to etch away unnecessary areas, forming the upper electrode of the photo-electric element S11, the source and drain electrodes as the main electrodes of the TFT T11, the upper electrode of the capacitor C11, and the signal line SIG.

Only the channel portion of the n-type layer of the TFT T11 is etched by RIE. Thereafter, the unnecessary portions of the SiN layer 7, the i-type layer 4, and the n-type layer 5 are removed by etching to isolate the respective elements. With this process, the photo-electric element S11, the TFT T11, and the capacitor C11 are completed. As is obvious, although only the first pixel has been described, the remaining pixels are also formed at once.

To improve durability, each element is generally covered with the passivation film 8 such as a SiN film, and the phosphor screen 12 such as CsI or $Gd_2O_2S$ is formed on the passivation film 8, as needed.

As described above, in this embodiment, the photo-electric element, the TFT, the capacitor, and the signal line SIG can be formed by only etching the following common layers, which are simultaneously deposited: the lower metal layer 2, the SiN layer 7, the i-type layer 4, the n-type layer 5, and the upper metal layer 6. In addition, only one injection blocking layer is formed in the photo-electric element S11, and the respective layers of the photo-electric element S11 can be formed without breaking vacuum. The gate insulating film/i-type layer interface of the TFT, which is important in terms of characteristics, can be formed without breaking vacuum. Furthermore, since the intermediate layer of the capacitor C11 contains an insulating layer that is resistant to leakage of charge due to heat, a capacitor having good characteristics can be formed.

Figure 4A:
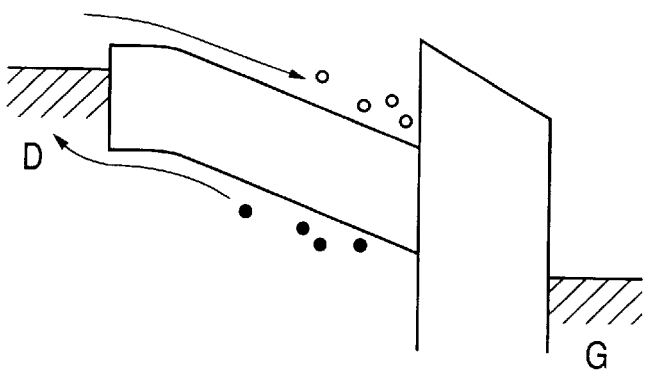
FIGS. 4A, 4B and 4C are energy band diagrams for explaining the operation of each photo-electric element.
Figure 4B:
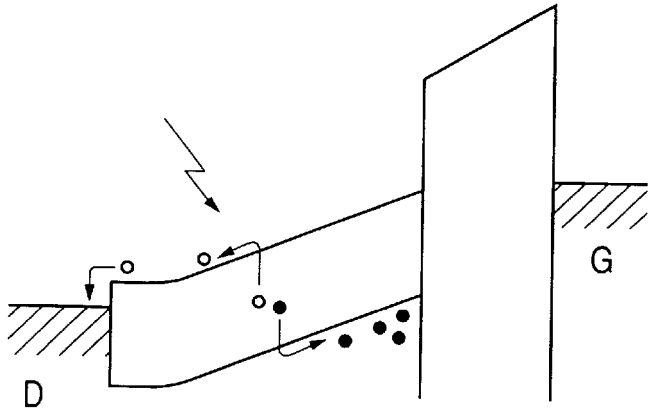

An example of the operation of each of the photo-electric elements S11 to S33 used in this embodiment will be described below. FIGS. 4A and 4B are energy band diagrams of each photo-electric element, respectively showing operations in the refresh mode and the photo-electric conversion mode. Each of FIGS. 4A and 4B shows the state of each layer in FIG. 3B in the depth direction. As described above, the lower metal layer 2 is a lower electrode (to be referred to as a G electrode hereinafter) made of, e.g., Cr. The SiN layer 7 is an insulating layer for preventing the passage of electrons and holes. The thickness of this layer is set to 500 Å or more to prevent electrons and holes from moving due to the tunnel effect. The intrinsic semiconductor i-type layer 4 made of hydrogenated amorphous silicon (a-Si) serves as a photo-electric semiconductor layer. The n-type layer 5 made of a-Si serves as an injection blocking layer for preventing injection of holes into the i-type layer 4 serving as the photo-electric semiconductor layer. The upper metal layer 6 is an upper electrode (to be referred to as a D electrode hereinafter) made of, e.g., Al. In this embodiment, the D electrode does not completely cover the n-type layer. The D electrode and the n-type layer are always set at the same potential to allow free movement of electrons therebetween. The following description is based on this. This photo-electric element operates in two types of modes, namely the refresh mode and the photo-electric conversion mode, depending on how the voltages are applied to the D and G electrodes.

In the refresh mode (a), the D electrode is set at a negative potential with respect to the G electrode, and the holes indicated by the full circles in the i-type layer 4 are attracted to the D electrode. At the same time, the electrons indicated by the open circles are injected into the i-type layer 4. At this time, some holes and electrons recombine and disappear in the n-type layer 5 and the i-type layer 4. When this state continues for a sufficiently long period of time, the holes in the i-type layer 4 are cleared.

To switch this state to the photo-electric conversion mode (b), the D electrode is set at a positive potential with respect to the G electrode. As a result, the electrons in the i-type layer 4 are instantaneously attracted to the D electrode. However, as the n-type layer 5 serves as an injection blocking layer, no holes are attracted to the i-type layer 4.

When light enters the i-type layer 4 in this state, the incoming light is absorbed to generate electron-hole pairs. These electrons are attracted to the D electrode owing to the electric field, and the holes move in the i-type layer 4 and reach the interface between the i-type layer 4 and the insulating layer 7. Since the holes cannot move in the insulating film, they stay in the i-type layer 4. At this time, the electrodes move to the D electrode, and the holes move to the insulating layer 7 interface in the i-type layer 4. For this reason, to maintain electric neutrality in the element, a current flows from the G electrode. This current corresponds to the electron-hole pairs generated by the light, and hence is proportional to the incident light.

When the refresh mode (a) is set again after the photo-electric conversion mode (b) is kept for a certain period of time, the holes remaining in the i-type layer 4 are attracted to the D electrode as described earlier, and a current corresponding to the holes flows at the same time. The amount of holes corresponds to the total amount of light received in the photo-electric conversion mode period. At this time, a current corresponding to the amount of electrons injected into the i-type layer 4 also flows. However, since this amount is almost constant, it suffices if this current is subtracted from the detected value. That is, in this embodiment, each of the photo-electric elements S11 to S33 can output the amount of incident light in real time, and at the same time, can output the total amount of light received within an extended period of time. This is the major feature of each photo-electric element in this embodiment.

Figure 4C:
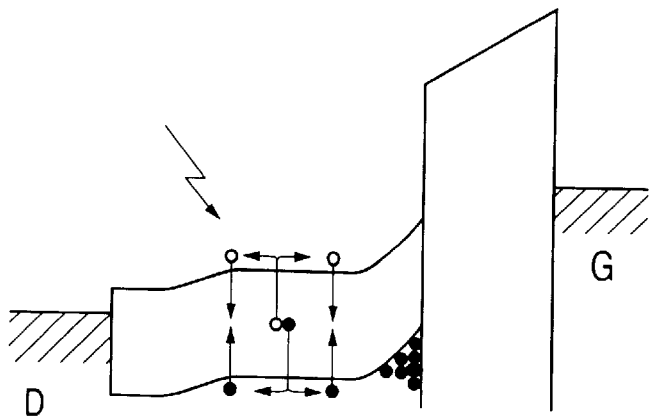

If, however, the duration of the photo-electric conversion mode is prolonged or the illuminance of incident light is high for some reason, no current may flow as in FIG. 4C in spite of incident light. This is because, many holes remain in the i-type layer 4, and the electric field in the i-type layer 4 is reduced by the holes. As a result, the generated electrons are not attracted to the D electrode but recombine with the holes in the i-type layer 4. If the state of incident of light changes in this state, a current may flow unstably. By setting the refresh mode again, however, the holes in the i-type layer 4 are removed, and a current proportional to light can be obtained in the next photo-electric conversion mode.

In the above description, ideally, all the holes are cleared from the i-type layer 4 in the refresh mode. Even if, however, the holes are partly removed, a current similar to that described above flows, and no problem is posed. That is, it suffices if the state is not set at one as shown in FIG. 4C when detection is performed in the next photo-electric conversion mode. That is, the potential of the D electrode with reference to the G electrode in the refresh mode, the duration of the refresh mode, and the characteristics of the injection preventing layer of the n-type layer 5 can be determined. In addition, injection of electrons into the i-type layer 4 in the refresh mode is not a necessary condition, and the potential of the D electrode with reference to the G electrode is not limited to a negative potential. This is because, when many holes remain in the i-type layer 4, the electric field in the i-type layer 4 acts in the direction to move the holes toward the D electrode even if, for example, the D electrode 15 is set at a positive potential with reference to the G electrode. Similarly, with regard to the characteristics of the injection blocking layer of the n-type layer 5, injection of electrons into the i-type layer 4 is not a necessary condition.

Figure 5:
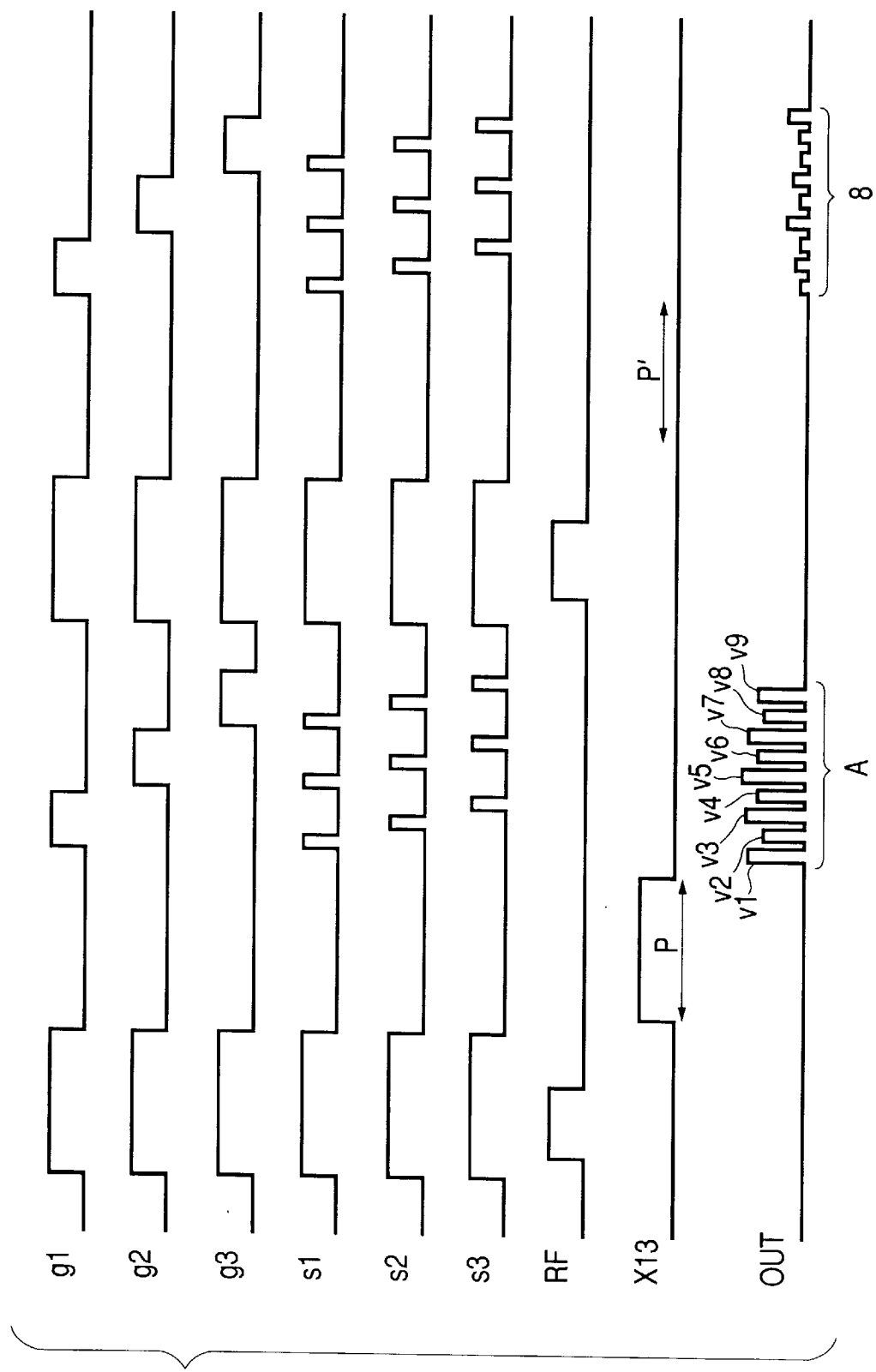
FIG. 5 is a timing chart for explaining an example of the operation timing of the image sensing apparatus.

An example of operation of the radiation image sensing apparatus in this embodiment will be described next with reference to FIGS. 1, 2, and 5. As described above, if the photo-electric element in this embodiment is periodically refreshed, it operates as an optical sensor for outputting a photocurrent proportional to incident light in the photo-electric conversion mode. FIG. 5 is a timing chart showing an example of operation in this embodiment.

First of all, the doctor or technician places the patient to be diagnosed, i.e., the object 11, between the X-ray source 10 and the two-dimensional area sensor 20, and poses the object 11 to observe the portion to be diagnosed. At the same time, the doctor or technician operates the control panel 32 to input conditions for an optimal photographic output in consideration of the state, physique, and age of the patient, which have been obtained by inquiries, (corresponding to the size (thickness), material, state, and the like of the object if the object is an inanimate object). The corresponding signal is an electrical signal, which is transmitted to the AE controller 30. At the same time, these conditions are stored in the condition memory circuit 40.

When the doctor or technician depresses the photographic exposure start button 71 in this state, the photographing mode is started. First of all, the system control circuit 70 refreshes the two-dimensional area sensor 20. The refresh operation will be described below. Shift registers SR1 and SR2 apply high-level signals to control lines g1 to g3 and s1 to s3. As a result, the transfer TFTs T11 to T33 and switches M1 to M3 are turned on, and the D electrodes of all the photo-electric elements S11 to S33 are set at the GND potential (because the input terminal of an integration detector Amp is designed to be set at the GND potential). At the same time, the refresh control circuit RF outputs a High-level signal to turn on the switch SWg. The G electrodes of all the photo-electric elements S11 to S33 are then set at a positive potential by the refresh power supply Vg. Then, all the photo-electric elements S11 to S33 are set in the refresh mode to be refreshed. Thereafter, the refresh control circuit RF outputs a Low-level signal to turn on the switch SWs. The G electrodes of all the photo-electric elements S11 to S33 are then set at a negative potential by the read power supply Vs. As a consequence, all the photo-electric elements S11 to S33 are set in the photo-electric conversion mode. At the same time, the capacitors C11 to C33 are initialized. When the shift registers SR1 and SR2 apply Low-level signals to the control lines g1 to g3 and s1 to s3, in this state, the transfer TFTs T11 to T33 and the switches M1 to M3 are turned off, and the D electrodes of all the photo-electric elements S11 to S33 become open in DC term. However, the potentials of the D electrodes are held by the capacitors C11 to C13. Since no X-rays are incident at this time, no light enters any of the photo-electric elements S11 to S33. No photocurrent therefore flows, and the refresh operation is complete.

At this time, the temperature sensor 33 detects the temperature in a room during photographic exposure, the temperature of the tube, and the temperatures of components, e.g., the two-dimensional area sensor 20, whose characteristics and optimal operation conditions change with changes in temperature, and inputs the resultant data to the AE controller 30. These detected temperatures are the temperatures immediately before photographic exposure. At the same time, these temperatures are stored as conditions in the condition memory circuit 40.

The AE controller 30 determines initial conditions for photographic exposure in accordance with the information from the control panel 32 and the information from the temperature sensor 33. At the same time, these initial conditions are stored in the condition memory circuit 40. The initial conditions include the voltage, current, and maximum pulse width of the tube of the X-ray source 10 and the drive speed of the two-dimensional area sensor 20. If, for example, the chest is set with the control panel 32, the voltage of the tube of the X-ray source 10 is set to be high. In contrast to this, if the abdomen is set, the tube voltage is set to be low. In addition, if a child or pregnant woman is designated as a patient with the control panel 32, the duration of exposure based on the photo timer 31 is set to be short, and the maximum pulse width is also set to be short. If the temperature of the two-dimensional area sensor 20 is high, a large dark current flows in each photo-electric element. However, since the performance of each TFT is high, the drive speed is set to be high to suppress build-up of dark currents, thus setting optimal conditions that prevent a decrease in S/N ratio. In contrast to this, if the temperature of the two-dimensional area sensor 20 is low, the performance of each TFT is low. However, since only a small dark current flows in each photo-electric element, the drive speed is set to be low to suppress image distortion due to a deterioration in charge transfer performance of each TFT.

When x-rays are emitted (X-rays 13 are set at high level) in these initial conditions and are transmitted through the object 11 to strike the phosphor screen 12, the X-rays are converted into light beams. These light beams are then incident on the photo-electric elements S11 to S33. At the same time, the light beams are incident on the photo timer 31 placed between the object 11 and the two-dimensional area sensor 20. These light beams contain information about the internal structure of a human body or the like. The output from the photo timer 31 is input to the AE controller 30 from time to time. When the integrated value of the outputs exceeds a predetermined value set in the initial conditions, the AE controller 30 stops the irradiation of X-rays (X-rays 13 are set at low level). With this operation, the optimal exposure amount for photographic exposure can be obtained. If the maximum pulse width determined in the initial conditions is detected, the AE controller 30 stops the irradiation of X-rays regardless of the output from the photo timer 31. In this case, these actual pulse widths are stored as exposure times in the condition memory circuit 40.

A predetermined amount of photocurrent flowing owing to this light is stored as charge in each of the capacitors C11 to C33 and held after the end of incidence of X-rays. The two-dimensional area sensor 20 then reads signal charges. The shift register SR1 applies a high-level control pulse to the control line g1, and the shift register SR2 applies control pulses to the control lines s1 to s3, thereby sequentially outputting v1 to v3 through the transfer TFTs T11 to T13 and the switches M1 to M3. Similarly, other light signals are output under the control of the shift registers SR1 and SR2. With this operation, the two-dimensional information of the internal structure of the human body or the like are obtained as v1 to v9.

These outputs are input to the gain adjustment circuit 21 and the AE controller 30. The AE controller 30 sequentially determines a gain for making these outputs have suitable values, and stores the determined value in the condition memory circuit 40. At the same time, the AE controller 30 instructs the gain adjustment circuit 21. With this operation, the output from the gain adjustment circuit 21 becomes the optimal photographic output for the subsequent processing. This photographic output is temporarily stored in the frame memory 50 as a photographic output storage means through the switch 51 controlled by the system control circuit 70.

As described previously, the AE controller 30 automatically controls the X-ray source 10, the two-dimensional area sensor 20, and the gain adjustment circuit 21 almost in real time in accordance with the settings in the control panel 32, the temperature sensor 33, the photo timer 31, and the two-dimensional area sensor 20 and outputs therefrom. Consequently, a photographic output can be obtained under almost optimal conditions. The photographic mode is then terminated.

The system control circuit 70 sets the correction mode and causes the two-dimensional area sensor 20 to refresh again. After the refresh operation, the system control circuit 70 loads the various conditions stored in the condition memory circuit 40 into the AE controller 30 to perform photographic exposure. The system control circuit 70 causes the respective components other than the X-ray source 10 to operate under the same conditions as those in the photographic mode. That is, the system control circuit 70 causes the respective components to operate on the basis of the values stored in the condition memory circuit 40 without using the outputs from the temperature sensor 33 and the photo timer 31. The system control circuit 70 does not cause the X-ray source 10 to operate in the correction mode, and hence no X-rays are emitted (in FIG. 5, an interval P' corresponding to an interval P in which X-rays are emitted). Although the X-ray source 10 is not operated, the two-dimensional area sensor 20 reads after a period of time corresponding to an exposure time in the photographic mode. The drive speed and the gain of the gain adjustment circuit 21 are set to be the same as those in the photographic mode. The output from the gain adjustment circuit 21 at this time is used as a correction output. That is, a correction output can be obtained by setting/controlling the X-ray source 10, the two-dimensional area sensor 20, and the gain adjustment circuit 21 in accordance with the values stored in the condition memory circuit 40.

This correction output reflects the dark current flowing in each pixel, the fixed pattern noise in the transfer mode, the offset voltages of the internal amplifier of the two-dimensional area sensor 20 and the gain adjustment circuit 21, and the like. Since the storage time for this correction output is the same as that in the photograph mode, the degree of influence of the build-up of the dark current on the correction output is also the same as that in the photograph mode. In addition, since the drive speed for the correction output is the same as that in the photographic mode, the degree of influence of the fixed pattern due to the influences of clock leakage and the like on the correction amount is the same as that in the photographic mode. That is, since the same operation is performed in the photographic mode and the correction mode in accordance with the data stored in the condition memory circuit 40 except for the operation of the X-ray source, all the influence factors that are undesirable for photographing operation as well as the above influence factors are the same in both the modes except for those associated with emission/non-emission of X-rays. The correction output therefore contains only undesirable errors in a photographic output in the same amount in the two modes.

If, therefore, the photographic output stored in the frame memory 50 and the correction output obtained in the correction mode are respectively represented by A and B, and the arithmetic processing circuit 60 performs the following subtraction:

$$O=A-B$$

then, a good image information output O can be obtained, from which errors such as the fixed pattern in the photographic output obtained in the photographic mode are removed. In this case, for the sake of simplicity, the simple equation (O=A−B) is presented. In practice, however, more complicated arithmetic processing is preferably done to obtain a good quality image.

In this embodiment, the two-dimensional area sensor is constituted by a two-dimensional array of 3×3 pixels, i.e., nine pixels, and the outputs from the pixels are transferred/output three at a time. However, the present invention is not limited to this. If, for example, 2,000×2,000 pixels are arranged two-dimensionally, with 5×5 pixels being arranged per 1 mm×1 mm area, a 40 cm×40 cm two-dimensional area sensor can be obtained, and a radiation image sensing apparatus for medical X-ray diagnosis can be obtained. The output from this apparatus can be instantaneously displayed on a CRT unlike the case of a film. In addition, the output can be converted into a digital output, which can be converted into an output suited for a specific purpose intended by image processing using a computer. Furthermore, this output can be stored in a magneto-optic disk. A past image can therefore be retrieved instantaneously. Moreover, since the sensitivity is higher than that of a film, a clear image can be obtained by using weak X-rays that hardly affect the human body.

[Second Embodiment]

The second embodiment of the present invention will be described next. The second embodiment greatly differs from the first embodiment in the arrangements and operations of the system control circuit 70, the AE controller 30, and the arithmetic processing circuit 60 in FIG. 1. Since other arrangements and operations are nearly the same as those in the first embodiment, only different portions will be described with reference to FIG. 1.

The second embodiment is characterized in that a system control circuit 70 moves a patient, i.e., an object 11, when a correction output is to be obtained. For example, this embodiment may include a lamp for guiding the movement of the object, a sensor for checking the movement of the object, a moving mechanism for a base that supports the patient, and a control circuit for the mechanism. A correction output is obtained as follows. After the object 11 is moved from the image sensing apparatus, the same conditions as those in the preceding photographic exposure operation are set in accordance with a condition memory circuit 40, and an AE controller 30 is controlled to operate the system. With this operation, reference light is irradiatedon a two-dimensional area sensor 20 in the absence of the object 11. The correction output obtained at this time is a correction output that can correct gain variations in an image information irradiation means including the space occupied by an X-ray source 10, a phosphor screen 12, and the two-dimensional area sensor 20, the two-dimensional area sensor 20, and a gain adjustment circuit 21. In this case, the reference light is light that is sent on the two-dimensional area sensor 20 under the same conditions as those in photographic exposure operation in the absence of the object. That is, this light contains information obtained by subtracting only the information about the object from image information light 14, and hence contains information about unnecessary variations, errors, and the like that cause a decrease in S/N ratio in the image information irradiation means.

An arithmetic processing circuit 60 can obtain an image information output O, from which errors in photographing operation due to gain variations in the image information irradiation means including the space occupied by the X-ray source 10, the phosphor screen 12, the two-dimensional area sensor 20, the two-dimensional area sensor 20, and the gain adjustment circuit 21 are removed, on the basis of the photographic output stored in a frame memory 50 and the correction output based on the reference light in the absence of the object 11. This image information output O is transmitted to an image processing system or the like.

The operation of the radiation image sensing apparatus of this embodiment will be described below. The operation in the photographic mode is the same as that in the first embodiment. After the operation in the photographic mode, the system control circuit 70 sets the correction mode again and causes the two-dimensional area sensor 20 to refresh. After the refresh operation, various conditions stored in the condition memory circuit 40 in photographic exposure operation are loaded into the AE controller 30. The operation in the correction mode is then performed under the same conditions as those in the photographic mode except that the object 11 is not placed between the X-ray source 10 and the two-dimensional area sensor 20. More specifically, the image sensing apparatus operates on the basis of the values stored in the condition memory circuit 40 without using outputs from a temperature sensor 33 and a photo timer 31. The drive speed and the gain of the gain adjustment circuit 21 are set to be the same as those in the photographic mode. At this time, the output from the gain adjustment circuit 21 is used as a correction output. This correction output reflects sensitivity and gain variations in the image information irradiation means including the space occupied by the X-ray source 10, the phosphor screen 12, and the two-dimensional area sensor 20 and sensitivity and gain variations in the two-dimensional area sensor 20 and the gain adjustment circuit 21. If, therefore, the photographic output stored in the frame memory 50 and the correction output obtained in the correction mode are respectively represented by A and B, and the arithmetic processing circuit 60 performs the following division:

$$O = A \div B$$

then, a good image information output O can be obtained, from which errors due to sensitivity and gain variations in the photographic output obtained in the photographic mode are removed. In this case, for the sake of simplicity, the simple equation (O=A÷B) is presented. In practice, however, more complicated arithmetic processing is preferably performed to obtain a good quality image.

[Third Embodiment]

Figure 6:
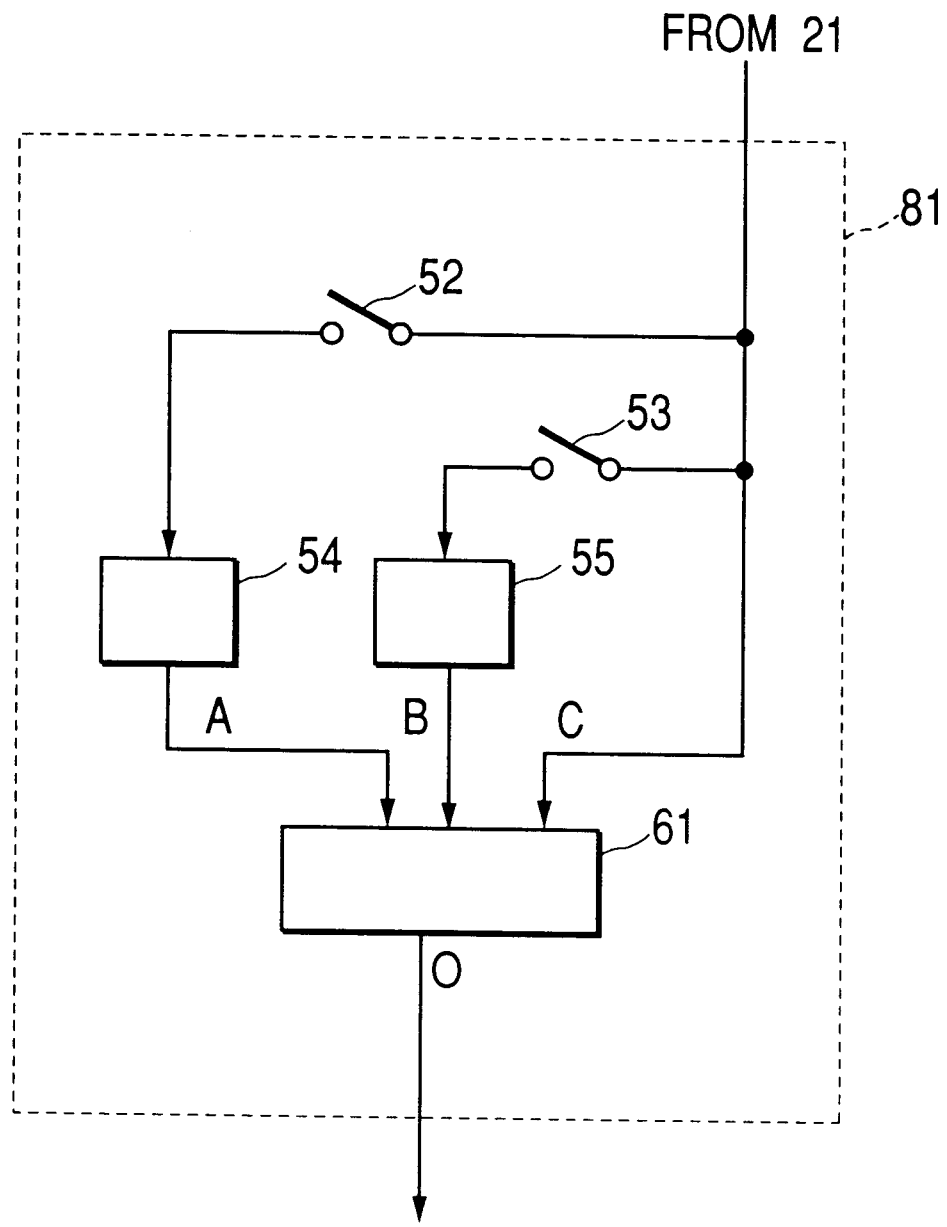
FIG. 6 is a schematic block diagram for explaining an example of a correction circuit.

FIG. 6 is a block diagram showing a correction circuit 81 according to the third embodiment of the present invention. The arrangement of the system of this embodiment is the same as that of the first and second embodiment except for the correction circuit 81. The correction circuit 81 in this embodiment differs from the correction circuit 80 in FIG. 1 in that the circuit 81 includes two switches, i.e., A and B switches 52 and 53 and two frame memories, i.e., A and B frame memories 54 and 55. In addition, an arithmetic processing circuit 61 has three inputs A, B, and C unlike in the first and second embodiments.

The operation of the third embodiment will be described below. The operation of this embodiment includes the photographic mode, correction mode 1, and correction mode 2.

The operation in the photographic mode is roughly the same as that in the first and second embodiments except that the photographic output is stored as a photographic output A in the A frame memory 54 through the A switch 52. In this case, the B switch 53 is open, and the B frame memory 55 undergoes no change.

The operation in correction mode 1 is almost the same as that in the correction mode in the first embodiment except that the correction output is not processed by the arithmetic processing circuit but is stored as a correction output B in the B frame memory 55 through the B switch 53. In this case, the A switch 52 is open, and the A frame memory undergoes no change.

The operation in correction mode 2 is almost the same as that in the correction mode in the second embodiment except that the arithmetic processing circuit 61 receives the photographic output A obtained in the photographic mode from the A frame memory 54, the correction output B obtained in correction mode 1 from the B frame memory 55, and the correction output in correction mode 2 as a correction output C. The arithmetic processing circuit 61 performs subtraction and division for these inputs:

$$O = (A - B) \div C$$

As a result, this apparatus can obtain a good image information output O from which errors such as a fixed pattern in the photographic output obtained in the photographic mode and errors due to sensitivity and gain variations are removed. In this case, for the sake of simplicity, the simple equation (O=(A−B)÷C) is presented. In practice, however, more complicated arithmetic processing is preferably performed to obtain a good quality image.

In this embodiment, two frame memories are used. However, the present invention is not limited to this. For example, three frame memories may be used to add another correction mode. With this arrangement, if, for example, the tube current in an X-ray source 10 is reduced to ½, and a correction output is obtained in the absence of an object 11, the nonlinear characteristics of a two-dimensional area sensor 20 can also be corrected.

The present invention is not limited to the three embodiments described above. If, for example, an image information irradiation device is designed to use an electronic flash unit, an object, and a lens, a still camera having an AE function can be obtained. In addition, this device may not use an electronic flash unit but may use natural light, an object, and a lens. In this case, a storage type photo-electric element may be used, and the storage time may be automatically controlled.

In addition, the photo-electric element is not limited to the one that is sensitive to visible light. For example, an element that is sensitive to infrared light, ultraviolet light, or radiation may be used. If, for example, an element that is sensitive to X-rays is used, an image sensing apparatus can be obtained without using the phosphor screen 12 serving as a wavelength converter. In this case, image information light is X-rays having image information.

Assume that the gain adjustment circuit includes a plurality of analog/digital converters, a more suitable converter can be selected in accordance with the value of the output from the image sensing means, and the selection of a converter can be automatically controlled by the photographic condition control means. That is, assume that a proper combination of a plurality of combinations of integration detectors Amp and low-precision A/D converters, i.e., a combination that does not overflow and has an integration detector Amp having a gain as high as possible, is automatically selected, and the output from the selected combination is used as a photographic output for each bit. In this case, this selected data is stored in units of bits, and fixed pattern and gain variation data are obtained from the same selected data in the correction mode, thereby providing a high-precision image sensing apparatus at a lower cost. Since the selected data for each bit cannot be obtained before the photographic mode, and correction data cannot be generated by the integration detector Amp from which a photographic output is obtained in the conventional image sensing apparatus, high-precision correction cannot be performed. In contrast to this, the present invention can perform high-precision correction.

Obviously, sensors serving as image sensing means may be arranged one-dimensionally instead of two-dimensionally. That is, the same effects as those described can be obtained with a one-dimensional line sensor.

As has been described above, according to the present invention, substantially the same conditions as those set to obtain data used for correction can be set for actual photographing operation. For this reason, by correcting the stored photographic output using this correction output, a photographic output with fewer errors can be obtained, and hence image information with high S/N ratio can be obtained.

According to the present invention, even if various types of automatic control are performed, a correction output can be obtained under the same conditions as those for photographing operation. This can provide an image sensing apparatus that is easy to use and can easily perform photographing operation under nearly optimal conditions.

With the use of a photographic condition control means and a condition storage means, an inexpensive image sensing apparatus can be provided, which can obtain a correction output under the same conditions as those for photographing operation after a photographic output is obtained while various types of automatic control are activated, thereby easily obtaining high-precision image information with few correction errors and a high S/N ratio without any mistakes.

In the present invention, since correction data can be obtained immediately after an object such as a patient is imaged, more suitable correction data can be obtained with no or almost no time for setting and the like as compared with the case wherein correction data is obtained before imaging. The present invention is therefore advantageous especially when correction data is obtained by X-ray irradiation.

In addition, since correction data is obtained under conditions corresponding to or reflecting the imaging conditions for imaging operation, more accurate correction data can be obtained. Information with a high S/N ratio can be quickly obtained more easily without increasing the complexity and cost of the apparatus.

What is claimed is:

1. An image sensing apparatus, comprising:
   image sensing means including a plurality of photo-electric elements arranged one or two-dimensionally;
   image information irradiation means including a light source for emitting radiation, for producing a photographing light;
   means for storing a photographic output obtained in a photographic mode;
   means for storing a photographic condition in the photographic mode;
   control means for controlling a drive condition for said image sensing means and said image information irradiation means;
   correction output obtaining means for obtaining a correction output in a correction mode, which is activated while said image sensing means is irradiated with photographing light in the absence of an object, by using the stored photographic condition, wherein said correction output obtaining means obtains at least two correction outputs for correcting the photographic output in a plurality of correction modes under different operating conditions of said light source controlled by said controlling means; and
   correcting means for correcting the photographic output by using the correction output.

2. An apparatus according to claim 1, wherein said correcting means includes arithmetic processing means for arithmetically processing the photographic output and the correction output.

3. An apparatus according to claim 2, wherein said arithmetic processing means has at least division function.

4. An apparatus according to claim 1, wherein said controlling means is capable of controlling at least one of irradiation intensity, irradiation time and distance from said image sensing means of said light source.

5. An apparatus according to claim 1, wherein said light source comprises an X-ray source.

6. An apparatus according to claim 5, wherein said controlling means is capable of controlling at least one of tube voltage, tube current, irradiation time, distance from said image sensing means and a filter of said X-ray source.

7. An apparatus according to claim 1, wherein said light source is an X-ray source and the operating conditions of said light source in the plurality of correction modes are varied in at least one of tube current and irradiation time.

8. An apparatus according to claim 1, further comprising a wavelength converter for converting a wavelength of photographing light into a wavelength in a photosensitive wavelength region of said photo-electric element.

9. An apparatus according to claim 8, wherein said wavelength converter comprises a phosphor screen.

10. An apparatus according to claim 1, wherein said control means has a memory circuit for receiving an output from a photo timer for measuring an amount of photographing light.

11. An apparatus according to claim 1, wherein said photo-electric element is of a storage type.

12. An apparatus according to claim 1, wherein said photo-electric element is made of amorphous silicon.

13. An image sensing apparatus, comprising:
   image sensing means including a plurality of photo-electric elements arranged one or two-dimensionally;
   image imformation irradiation means including a light source for emitting radiation, for producing a photographic mode;
   control means for controlling said image information irradiation means;
   correction output obtaining means for obtaining a correction output in a correction mode, which is activated while said image sensing means is irradiated with photographing light in the absence of an object, wherein said correction output obtaining means obtains at least two correction outputs for correcting the photographic output in a plurality of correction modes under different operating conditions of said light source controlled by said controlling means; and
   correcting means for correcting the photographic output by using the correction output.

14. An apparatus according to claim 13, wherein said correcting means includes arithmetic processing means for arithmetically processing the photographic output and the correction output.

15. An apparatus according to claim 14, wherein said arithmetic processing means has at least division function.

16. An apparatus according to claim 13, wherein said control means is capable of controlling at least one of irradiation intensity, irradiation time and distance from said image sensing means of said light source.

17. An apparatus according to claim 13, wherein said light source comprises an X-ray source.

18. An apparatus according to claim 17, wherein said control means is capable of controlling at least one of tube voltage, tube current, irradiation time, distance from said image sensing means and a filter of said X-ray source.

19. An apparatus according to claim 13, wherein said light source is an X-ray source and the operating conditions of said light source in the plurality of correction modes are varied in at least one of tube current and irradiation time.

20. An apparatus according to claim 13, further comprising a wavelength converter for converting a wavelength of photographing light into a wavelength in a photosensitive wavelength region of said photo-electric element.

21. An apparatus according to claim 20, wherein said wavelength converter comprises a phosphor screen.

22. An apparatus according to claim 13, wherein said control means has a memory circuit for receiving an output from a photo timer for measuring an amount of photographing light.

23. An apparatus according to claim 13, wherein said photo-electric element is of a storage type.

24. An apparatus according to claim 13, wherein said photo-electric element is made of amorphous silicon.

* * * * *

UNITED STATES PATENT AND TRADEMARK OFFICE
CERTIFICATE OF CORRECTION

PATENT NO. : 6,333,963 B1
DATED : December 25, 2001
INVENTOR(S) : Noriyuki Kaifu et al.

It is certified that error appears in the above-identified patent and that said Letters Patent is hereby corrected as shown below:

Title page,
Item [75], Inventors, "Hachioji;" should read -- Tokyo; --.
Item [57], ABSTRACT,
Line 4, "-one-" should read -- one- --.

Column 1,
Lines 10 and 17, "-one-" should read -- one- --.
Line 30, "-2-" should read -- 2- --.
Line 42, "-4-" should read -- 4- --.

Column 2,
Line 21, "to" should read -- to provide --.
Lines 38 and 51, "-one-" should read -- one- --.

Column 3,
Lines 8, 38 and 65, "-one-" should read -- one- --.
Line 34, "thereby." should read -- thereby --.

Column 5,
Line 56, "ON/OFF-controls" should read -- ON/OFF controls --.

Column 7,
Line 20, "-one-" should read -- one- --.

Column 8,
Line 48, "capacitor Cll." should read -- capacitor C11. --.
Line 57, "A1" should read -- Al --.

Column 10,
Line 37, "of" (second occurrence) should be deleted.
Line 59, "D electrode 15" should read -- D electrode --.

Column 11,
Line 29, "High-" should read -- high- --.
Lines 35 and 41, "Low-level" should read -- low-level --.

Column 12,
Line 20, "x-rays" should read -- X-rays --.
Line 47, "T13" should read -- T33 --.

Column 14,
Line 40, "irradiatedon" should read -- irradiated on --.

UNITED STATES PATENT AND TRADEMARK OFFICE
CERTIFICATE OF CORRECTION

PATENT NO. : 6,333,963 B1
DATED : December 25, 2001
INVENTOR(S) : Noriyuki Kaifu et al.

It is certified that error appears in the above-identified patent and that said Letters Patent is hereby corrected as shown below:

Column 15,
Line 55, "roughtly" should read -- roughly --.

Column 16,
Line 10, "$O=(A-B) \div C$" should read -- $O=(A-B) \div C.$ --.

Column 17,
Line 42, "one" should read -- one- --.

Column 18,
Lines 4 and 57, "least" should read -- least a --.
Line 34, "one" should read -- one- --.

Signed and Sealed this

Twenty-fourth Day of December, 2002

JAMES E. ROGAN
*Director of the United States Patent and Trademark Office*